(12) United States Patent
Han et al.

(10) Patent No.: US 12,437,150 B2
(45) Date of Patent: Oct. 7, 2025

(54) SYSTEM AND METHOD OF PERFORMING DATA TRAINING ON MORPHEME PROCESSING RULES

(71) Applicants: Hyundai Motor Company, Seoul (KR); Kia Corporation, Seoul (KR); Industry-Academic Cooperation Foundation, Yonsei University, Seoul (KR)

(72) Inventors: Kyuyeol Han, Yongin-si (KR); Cheongjae Lee, Suwon-si (KR); Junseok Kim, Seongnam-si (KR); Yo-Sub Han, Seoul (KR); Hyunjoon Cheon, Incheon (KR); Joonghyuk Hahn, Seoul (KR)

(73) Assignees: Hyundai Motor Company, Seoul (KR); Kia Corporation, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 247 days.

(21) Appl. No.: 17/982,963

(22) Filed: Nov. 8, 2022

(65) Prior Publication Data
US 2023/0143110 A1   May 11, 2023

(30) Foreign Application Priority Data
Nov. 8, 2021   (KR) .................. 10-2021-0152558

(51) Int. Cl.
*G06F 40/284*   (2020.01)
*G06F 40/253*   (2020.01)
*G10L 15/22*    (2006.01)

(52) U.S. Cl.
CPC .......... *G06F 40/253* (2020.01); *G06F 40/284* (2020.01)

(58) Field of Classification Search
None
See application file for complete search history.

(56) References Cited

U.S. PATENT DOCUMENTS

| | | | |
|---|---|---|---|
| 10,276,170 B2 * | 4/2019 | Gruber | G06F 16/9537 |
| 2014/0136188 A1 * | 5/2014 | Wroczynski | G06F 40/284 704/9 |

(Continued)

*Primary Examiner* — Seong-Ah A Shin
(74) *Attorney, Agent, or Firm* — Banner & Witcoff, Ltd.

(57) ABSTRACT

A method of processing a natural language may include generating a grammar used for analyzing a natural language by compressing a plurality of languages including common elements so that resources and time required for recognizing a grammar of an input sentence may be reduced. The method of processing a natural language may include separating an input sentence in units of morphemes, recognizing a grammar of the input sentence separated in units of morphemes, and analyzing a meaning of the input sentence based on the recognized grammar. The recognizing of the grammar may include recognizing a grammar that matches the input sentence separated in units of morpheme from among a plurality of pre-stored grammars, and the plurality of pre-stored grammars may include at least one grammar obtained by compressing two or more grammars to which at least one element among a plurality of elements constituting a single grammar is common.

17 Claims, 11 Drawing Sheets

(56) References Cited

U.S. PATENT DOCUMENTS

| | | | |
|---|---|---|---|
| 2015/0120302 A1* | 4/2015 | Mccandless | G06Q 30/02 |
| | | | 704/257 |
| 2015/0142448 A1* | 5/2015 | Tsujino | G10L 15/22 |
| | | | 704/275 |
| 2017/0011742 A1* | 1/2017 | Jing | G06F 40/268 |
| 2017/0031894 A1* | 2/2017 | Bettersworth | G06F 40/284 |
| 2019/0147870 A1* | 5/2019 | Taki | G10L 15/22 |
| | | | 704/233 |
| 2019/0228769 A1* | 7/2019 | Suzuki | G06F 40/30 |
| 2019/0244607 A1* | 8/2019 | Jo | G10L 15/22 |
| 2020/0058292 A1* | 2/2020 | Maeda | G06F 40/242 |
| 2020/0409981 A1* | 12/2020 | Kadatoka | G06F 40/284 |
| 2021/0097990 A1* | 4/2021 | Kim | G10L 15/1822 |

\* cited by examiner

INPUT SENTENCE: "geuncheo café chaj-a" (transliteration)

State Machine

FIG. 6

| COMPRESSION METHOD | ORIGINAL | COMMON ELEMENT EXTRACTION | SUB-RULE REPLACEMENT |
|---|---|---|---|
| Slot Centric | r1 → s1 t1 t2 t3t2<br>r2 → s1 t1 t3 | COMMON ELEMENT : s<br>NON-COMMON ELEMENT : t1 t3, t1 t2 t3 t2 | r1 → s1 v1<br>v1 → t1 t3 \| t1 t2 t3 t2 |
| Slot Centric | r1 → t2 t3 s1 t3 t1<br>r2 → t2 t3 s2 t3 t1 | COMMON ELEMENT : t3 t1, t2 t3<br>NON-COMMON ELEMENT : s1, s2 | R' → v1(s1 \| s2) v2<br>v1 → t2 t3<br>v2 → t3 t1 |
| Edit Distance | r1 → t1 s1 t2 t3<br>r2 → t1 t4 s1 t2 t5 | COMMON ELEMENT : t1, s1, t2<br>NON-COMMON ELEMENT : t4, t3, t5 | r' → t1 t4 ? s1 t2(t3 \| t5) |

SYSTEM AND METHOD OF PERFORMING DATA TRAINING ON MORPHEME PROCESSING RULES

CROSS-REFERENCE TO RELATED APPLICATION

This application claims under 35 U.S.C. § 119 the benefit of Korean Patent Application No. 10-2021-0152558, filed on Nov. 8, 2021 in the Korean Intellectual Property Office, the entire contents of which are incorporated herein by reference.

BACKGROUND

1. Field

The disclosure relates to a method of generating grammars capable of generating a plurality of grammars used for natural language analysis, a method of processing a natural language including the same, and a dialogue system for performing a dialogue with a user based on generated grammars.

2. Description of the Background

A dialog system is a system that may identify an intention of a user through a dialogue with the user and provide a service corresponding to the identified intention of the user.

In order for a dialogue system to have a dialogue with a user, the dialogue system needs to process an utterance input by the user, that is, a natural language. A natural language may refer to a language that humans use for communication in daily life, and may be distinct from an artificial language or a constructed language, such as a computer programming language.

For natural language processing, as natural language analysis, natural language understanding, natural language generation, and other related techniques may be used, and natural language analysis techniques may include morpheme analysis, syntax analysis, semantic analysis, and pragmatic analysis.

SUMMARY

The following summary presents a simplified summary of certain features. The summary is not an extensive overview and is not intended to identify key or critical elements.

Various examples of the disclosure provide a method of processing a natural language, a method of generating grammars, and a dialogue system that are capable of generating a grammar used for analyzing a natural language by compressing a plurality of languages including common elements so that resources and time required for recognizing a grammar of an input sentence may be reduced.

The technical objectives of the disclosure are not limited to the above, and other objectives may become apparent to those of ordinary skill in the art based on the following descriptions.

According to the disclosure, there is provided a method of processing a natural language, the method including: dividing an input sentence in units of morphemes; recognizing a grammar of the input sentence divided in units of morphemes; and analyzing a meaning of the input sentence based on the recognized grammar, wherein the recognizing of the grammar includes recognizing a grammar that matches the input sentence divided in units of morpheme from among a plurality of pre-stored grammars, wherein the plurality of pre-stored grammars include at least one grammar obtained by compressing two or more grammars to which at least one element among a plurality of elements constituting a single grammar is common.

The plurality of elements may include at least one slot and at least one token.

In the compressed at least one grammar, remaining elements except for a common slot among the at least one slot may be replaced with a sub-rule.

In the compressed at least one grammar, the common element may be replaced with a sub-rule.

In the compressed at least one grammar, remaining elements except for the common element may be represented using an operator.

The method may further include determining a domain, an intent, and an entity corresponding to the input sentence based on the meaning of the input sentence.

The recognizing of the grammar may include recognizing at least one slot in the input sentence divided in units of morphemes, and recognizing the matching grammar based on a type and location of the at least one slot.

According to the disclosure, there is provided a method of generating a grammar, the method including: generating a plurality of grammars from a plurality of training sentences; and compressing, among the plurality of grammars, two or more grammars to which at least one element among a plurality of elements constituting a single grammar is common.

The plurality of elements may include at least one slot and at least one token.

The compressing of the two or more grammars may include replacing remaining elements except for a common slot among the at least one slot with a sub-rule.

The compressing of the two or more grammars may include replacing the common element with a sub-rule.

The compressing of the two or more grammars may include representing remaining elements except for the common element using an operator.

According to the disclosure, there is provided a dialogue system including: a speech recognition module configured to convert an utterance of a user into an input sentence; a natural language understanding module configured to divide the input sentence in units of morphemes, recognize a grammar of the input sentence divided in units of morphemes, and analyze a meaning of the input sentence based on the recognized grammar; and a result processing module configured to perform processing for providing a service corresponding to the input sentence, wherein the natural language understanding module is configured to recognize a grammar that matches the input sentence divided in units of morphemes from among a plurality of pre-stored grammars, and wherein the plurality of pre-stored grammars include at least one grammar obtained by compressing two or more grammars to which at least one element among a plurality of elements constituting a single grammar is common.

The plurality of elements may include at least one slot and at least one token.

In the compressed at least one grammar, remaining elements except for a common slot among the at least one slot may be replaced with a sub-rule.

In the compressed at least one grammar, the common element may be replaced with a sub-rule.

In the compressed at least one grammar, remaining elements except for the common element may be represented using an operator.

The natural language understanding module may be configured to determine a domain, an intent, and an entity corresponding to the input sentence based on the meaning of the input sentence.

The natural language understanding module may be configured to recognize at least one slot in the input sentence divided in units of morphemes, and recognize the matching grammar based on a type and location of the at least one slot.

These and other features and advantages are described in greater detail below.

BRIEF DESCRIPTION OF THE DRAWINGS

These and/or other aspects of the disclosure will become apparent and more readily appreciated from the following description, taken in conjunction with the accompanying drawings of which:

FIG. 6 is a table showing types of methods of compressing a plurality of grammars, in a method of generating grammars;

DETAILED DESCRIPTION

Figure 1:
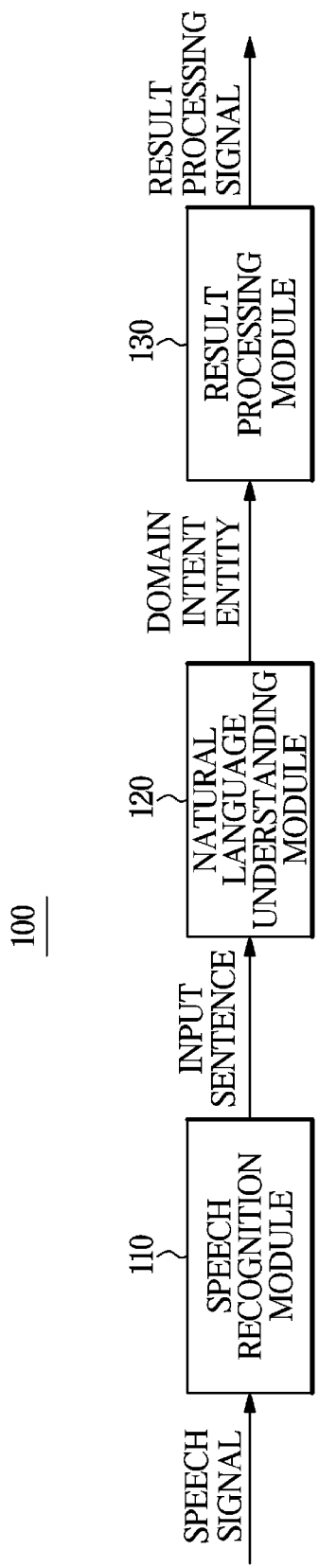
FIG. 1 is a block diagram illustrating components divided according to the operation of a dialogue system.

Various examples described in the specification and configurations shown in the accompanying drawings are exemplary, and various modifications may replace one or more examples, features, and the drawings of the present disclosure at the time of filing of the present application.

Further, identical symbols or numbers in the drawings of the present disclosure denote components or elements configured to perform substantially identical functions.

Further, terms used herein are only for the purpose of describing particular features and are not intended to limit to the present disclosure. The singular form is intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements are not limited by the terms, and the terms are only used to distinguish one element from another. For example, a first element could be termed a second element, and similarly, a second element could be termed a first element without departing from the scope of the present disclosure. The term "and/or" includes combinations of one or all of a plurality of associated listed items.

The terms, such as "~part", "~device", "~block", "~member", "~module", and the like may refer to a unit for processing at least one operation or act. For example, the terms may refer to at least process processed by at least one hardware, such as field-programmable gate array (FPGA)/application specific integrated circuit (ASIC), software stored in memories, and/or processors Reference numerals used for method steps are just used for convenience of explanation, but not to limit an order of the steps. Thus, unless the context clearly dictates otherwise, the written order may be practiced otherwise.

Hereinafter, examples of a method of processing a natural language, a method of generating grammars, and a dialogue system will be described with reference to the accompanying drawings.

Figure 2:
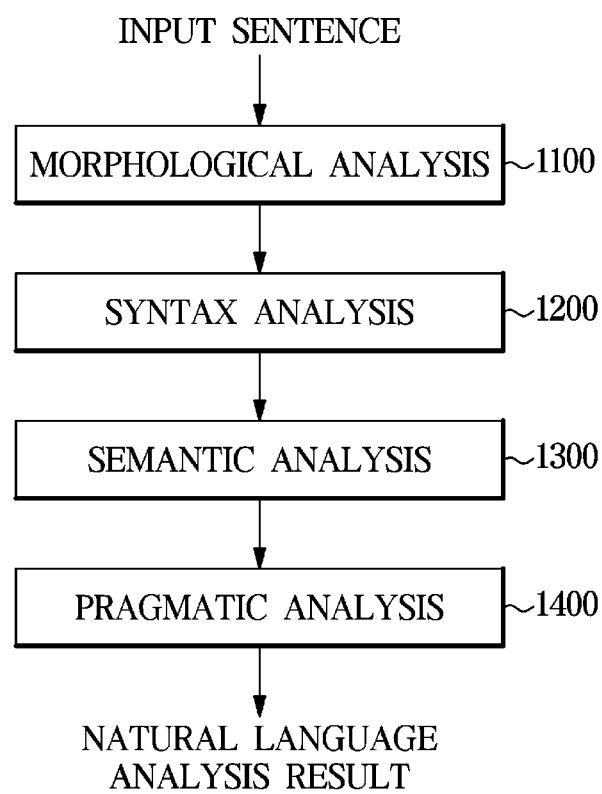
FIG. 2 is a flowchart illustrating a process of analyzing a natural language, in a method of processing a natural language.

FIG. 1 is a block diagram illustrating components divided according to the operation of a dialogue system. FIG. 2 is a flowchart illustrating a process of analyzing a natural language in a method of processing a natural language.

A dialogue system described herein may refer to a system that recognizes and understands an utterance of a user and provides a service corresponding to the utterance of the user.

Referring to FIG. 1, a dialog system 100 may include a speech recognition module 110 configured to convert an utterance of a user into text, a natural language understanding module 120 configured to determine an intention included in the utterance of the user, and a result processing module 130 configured to perform processing to provide a result corresponding to the intention of the user.

Although not shown in the drawings, the dialog system 100 may further include a dialog manager configured to manage the overall dialogue between the dialog system 100 and the user according to the design of the dialog system 100.

The speech recognition module 110 may be implemented as (or comprise) a speech to text (STT) engine, and may apply a speech recognition algorithm to an utterance of a user to convert the utterance into text.

For example, the speech recognition module 110 may use feature vector extraction technologies (e.g., Cepstrum, Linear Predictive Coefficient (LPC), Mel Frequency Cepstral Coefficient (MFCC), and/or Filter Bank Energy) to extract a feature vector from an utterance of a user.

The speech recognition module 110 may compare the extracted feature vector with a trained reference pattern to obtain a recognition result, for example after extracting the feature vector. For example, an acoustic model that models and compares signal characteristics of a speech or a language model that models a linguistic order relationship of words or syllables corresponding to a recognized vocabulary may be used.

The speech recognition module 110 may convert an utterance of a user into text, for example, based on a learning process using a machine learning or deep learning.

The natural language understanding module 120 may employ natural language understanding (NLU) technology to identify an intention of a user contained in an input sentence. Here, the input sentence may refer to text converted by the speech recognition module 110.

The natural language understanding module 120 may identify an intent and an entity required to perform the intent, for example, based on information (e.g., a domain, an entity name, a speech act, etc.) extracted from the input sentence.

As an example, if the input sentence is "Let's go home", the domain may be [navigation], the intent may be [Set. Route], and the entity required to perform control corresponding to the intent may be [departure, destination].

As another example, if the input sentence is "Turn on the air conditioner", the domain may be [vehicle control], the intent may be [turn on. air conditioner], and the entity required to perform control corresponding to the intent may be [temperature, air volume].

The result processing module 130 may, in order to perform processing for providing a service corresponding to the intention of the user, output a result processing signal to a user terminal and/or an external server. For example, if a service corresponding to the intention of the user is a vehicle-related control, the result processing module 130 may generate a control signal for performing the corresponding control and transmit the generated control signal to the vehicle.

Alternatively or additionally, if the service corresponding to the intention of the user is provision of specific information, the result processing module 130 may retrieve the corresponding information and deliver the retrieved information to the user terminal. As needed, such retrieval of information may be performed by another external server.

Alternatively or additionally, if the service corresponding to the intention of the user is provision of specific content, the result processing module 130 may request the content from an external server that provides the corresponding content.

Alternatively or additionally, if the service corresponding to the intention of the user is continuation of a simple dialogue, the result processing module 130 may generate a response to the utterance of the user and output the response as a speech.

The dialogue system 100 described above may be implemented by at least one memory in which a program (e.g. one or more sets of instructions) for performing the above-described operations is stored and at least one processor for executing the stored program.

The components of the dialogue system 100 may be divided based on the operations and/or functions thereof, and all or part of the components may share a memory and/or a processor.

Figure 11:
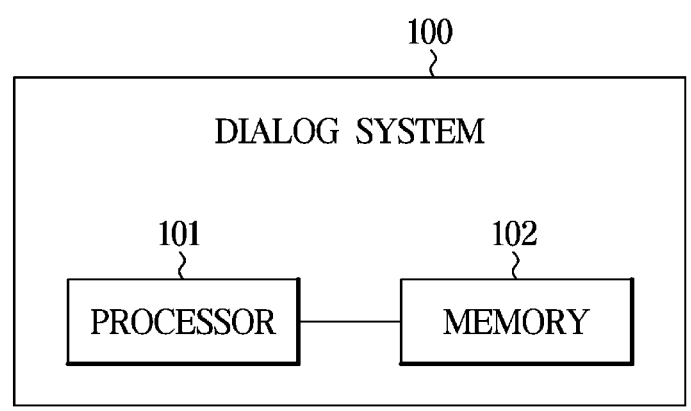
FIG. 11 shows that the dialog system include a processor and a memory.

FIG. 11 shows that the dialog system include a processor and a memory. Referring to FIG. 11, the dialog system 100 may include a processor 101 and a memory 102 as a computing device. The memory 102 may store programs, instructions, and/or applications for the operation of the dialog system 100. The processor 101 may execute programs, instructions, and/or applications stored in the memory 102.

The processor 101 may be a central processing unit (CPU) or a semiconductor device that processes instructions stored in the memory 102 and/or other storages. Each of the memory 102 and the storages may include various types of volatile or nonvolatile storage media. For example, the memory 102 may include a read only memory (ROM), a random access memory (RAM), and/or any other types of memory.

Accordingly, the operations of the method or algorithm described in connection with the embodiment(s) disclosed in the specification may be directly implemented with a hardware module, a software module, or a combination of the hardware module and the software module, which is executed by the processor 101. The software module may reside on a storage medium (e.g., the memory 102 and/or the storages) such as a random access memory (RAM), a flash memory, a read only memory (ROM), an erasable and programmable ROM (EPROM), an electrically EPROM (EEPROM), a register, a magnetic storage device (e.g., a hard disk drive), a solid-state memory device (e.g., a solid-state drive (SSD)), a removable disc, and/or a compact disc-ROM (CD-ROM). For example, the storage medium may be coupled to the processor 101. The processor 101 may read out information from the storage medium and may write information in the storage medium. Alternatively, the storage medium may be integrated with the processor 101. The processor and storage medium may be implemented with an application specific integrated circuit (ASIC). The ASIC may be provided in the computing device. Alternatively, the processor and storage medium may be implemented with separate components in the computing device.

The dialog system 100 may be provided in an external server or a user terminal, and some of the components may be provided in an external server and other components may be provided in a user terminal. The user terminal may be a mobile device, such as a smart phone, a tablet personal computer (PC), a wearable device, a home appliance having a user interface, a vehicle, etc.

A method of processing a natural language may be performed by the dialogue system 100. For example, the method of processing a natural language may include all or part of processes performed by the speech recognition module 110, the natural language understanding module 120, and the result processing module 130 of the dialog system 100.

For example, the method of processing a natural language may include only the processes performed by the natural language understanding module 120 and the result processing module 130, or may include only the processes performed by the natural language understanding module 120.

For example, the method of processing a natural language may include only a process of analyzing a natural language among the processes performed by the natural language understanding module 120.

On the other hand, the input sentence may be composed of a natural language. In order to extract information, such as domains, intents, entities, etc., from an input sentence composed of a natural language, natural language analysis may be performed to understand the structure and meaning of the input sentence, for example, prior to performing one or more other processes described herein.

Referring to FIG. 2, the method of processing a natural language may include, for natural language analysis, morphological analysis (1100), syntax analysis (1200), semantic analysis (1300), and pragmatic analysis (1400).

For natural language analysis, an input sentence (e.g., an input string) may be divided into smaller units for analysis (e.g., tokens). The input sentence may be subject to morpheme analysis to thereby be separated into tokens in a unit of morpheme. According to the morpheme analysis, the input sentence may be separated into morphemes, which may be the smallest units of meaning. A morpheme may represent the smallest unit in which meaning is analyzable. A morpheme may be a word or a part of a word indicating a grammatical or relational meaning, and may include a root, an ending, a proposition, a prefix, a suffix, and the like of a simple word.

Morpheme analysis of certain languages (e.g., Korean) may include a sequence of processes of dividing word segments based on spacing, dividing word segments except for propositions, and dividing each word segment into a stem and an ending. However, a single word may be used with multiple meanings, and a morpheme analysis dictionary may be used to resolve ambiguity and/or vagueness in morpheme analysis (e.g., due to such ambiguity caused by multiple meanings).

The input sentence separated in units of morphemes may be subject to syntax analysis. Syntax analysis may be a process of finding/determining the structure of a sentence using a grammar, and a grammar in natural language analysis may refer to structural properties of a sentence represented by a rule. Syntactic analysis may also be referred to as parsing.

According to syntax analysis, the role of each morpheme in the input sentence or the correlation between the morphemes may be analyzed.

After completion of the syntax analysis, an interpretation may be performed on the result to analyze the meaning of the input sentence. Such a semantic analysis may be considered as a process of determining the actual meanings of morphemes in the input sentence.

Pragmatic analysis may refer to analyzing a relationship between an input sentence and the real world. Thus, real-world knowledge and common sense may be used. According to the pragmatic analysis, an anaphora indicated by a pronoun in the input sentence may be found, and a speech act desired by the speaker may be determined.

Figure 3:
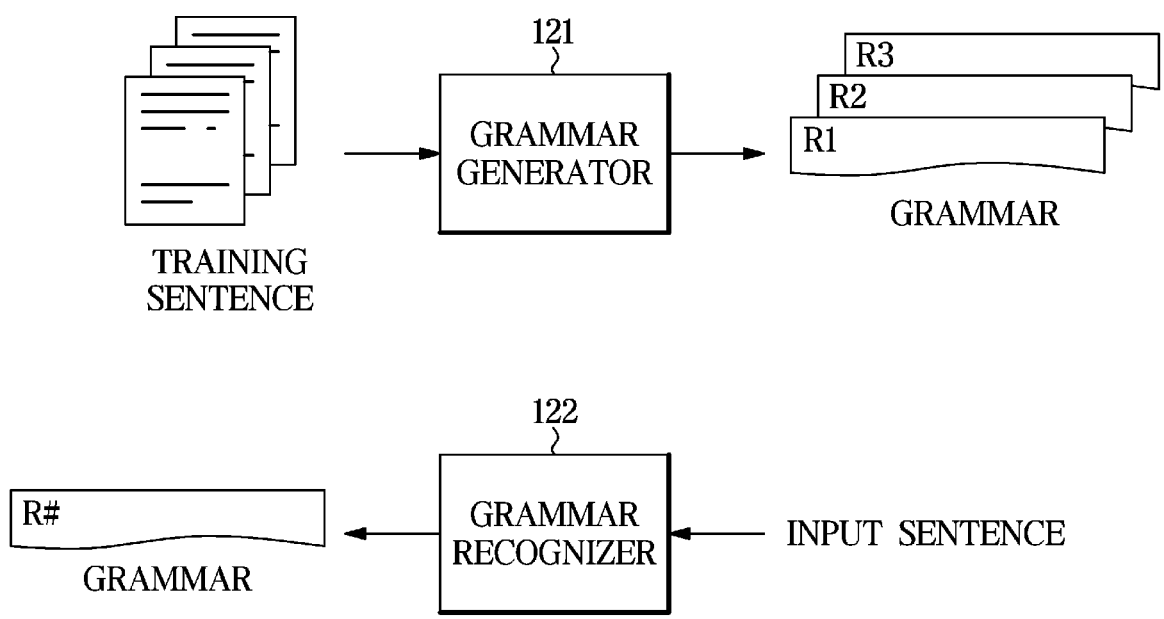
FIG. 3 is a diagram illustrating a process in which grammars are generated and a grammar of an input sentence is recognized, in a dialog system and a method of processing a natural language.
Figure 4:
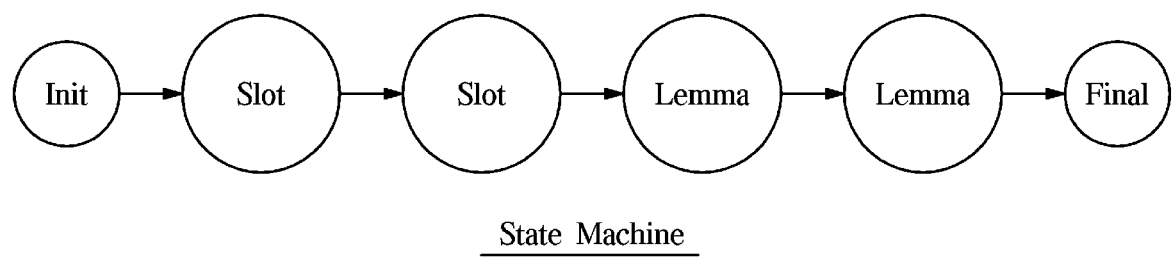
FIG. 4 is a diagram illustrating a process of recognizing a grammar of a specific example sentence, in a dialog system and a method of processing a natural language.

FIG. 3 is a diagram illustrating a process in which a grammar is generated and a grammar of an input sentence is recognized, in a dialog system and a method of processing a natural language. FIG. 4 is a diagram illustrating a process of recognizing a grammar of a specific example sentence, in a dialog system and a method of processing a natural language.

Referring to FIG. 3, the natural language understanding module 120 of the dialogue system 100 may include a grammar generator 121 configured to generate a plurality of grammars (e.g., in advance) and a grammar recognizer 122 configured to recognize a grammar of an input sentence.

The grammar generator 121 may generate a plurality of grammars R1, R2, R3, . . . , and so on using a plurality of training sentences. For example, one grammar may be generated for one training sentence.

The plurality of training sentences used to generate grammars may be a tagged corpus. A corpus may refer to a sample document or a set of sample sentences constructed for a natural language analysis task, and a tagged corpus may refer to a set of sample sentences that are subjected to part-of-speech (POS) tagging.

For example, NNG, JKS, VV, EC, VX, MAG, and EF could be used to denote the part-of-speech respectively according to a part-of-speech tagging dictionary. The NNG denotes common nouns. The JKS denotes subject case markers. The VV denotes verbs. The EC denotes connective endings. The VX denotes auxiliary predicate elements. The MAC denotes adverbs. The EF denotes sentence-closing ending.

The plurality of pre-generated grammars may be stored in the memory of the dialogue system 100, and the grammar recognizer 122 may recognize a grammar that matches the input sentence from among the stored plurality of grammars.

As an example, a grammar may be defined as follows.
G=(V, T, S, P)
V: {S, Entity_Type, Entity_Role, POS_Tag, Sub-rule}
T: {Morpheme, Entity_Value}
S={S}
P={Sub-rule→(V∪T∪Sub-rule)+, S→LSP(Sentential_Form)}

V denotes a finite set of objects referred to as a variable, T denotes a finite set of objects referred to as a terminal symbol, and S denotes a start symbol (e.g., a special element of V). P denotes a finite set of production rules.

Here, an entity may be used to fill a slot. A slot may refer to meaningful information related to an intent included in an utterance. A slot may be defined by a type indicating a classification system to which the value of the slot belongs, and a role and value in the sentence.

For example, in a sentence "Let's go from Seoul Station to Busan Station", "Seoul Station" and "Busan Station" have the same slot type, but have different roles in that "Seoul Station" is the departure and "Busan Station" is the destination.

Symbols used for the definition of the grammar above are summarized in [Table 1] below.

TABLE 1

| Symbol | Description |
|---|---|
| = | content of the right is assigned to the left |
| $ | variable name begins (described in the form of $role = type). |
| % | name of sub-rule |
| [ ] | left and right brackets |
| / | delimiter of lemma and tag of morpheme |
| * | lemma or tag is replaceable with *, meaning all lemmas or all tags. However, only lemma or tag is replaceable |
| + | AND operator, expressing morpheme combination within word segment |
| \| | OR operator, used with brackets (e.g., [a\|b\|c]), only used for morpheme units |
| space | separation between word segments |

Hereinafter, a process of recognizing a grammar will be described with reference to FIG. 4, in relation to a Korean input sentence of "geuncheo café chaj-a (transliteration of find a nearby café)" as an example.

The input sentence "geuncheo café chaj-a" may include two slots. The first slot has a type of "a relative distance" from the current location, and a value of "nearby". The second slot has a type of "a Point of Interest (POI) category", and a value of "café".

Referring to FIG. 4, the grammar recognizer 122 may recognize the grammar of the input sentence using a state machine. In response to the state machine reaching the final state from the initial state, it may be regarded/determined that a grammar is recognized.

For the first slot, a grammar in which a slot classified as a relative distance is located on the front of a sentence among a plurality of pre-stored grammars may be retrieved. In the case of slot recognition, back tracking may be attempted for a plurality of candidates, and if back tracking fails for all candidates, it may be determined that the recognition has failed.

For the second slot, a grammar in which a slot classified as a POI category is located after a slot classified as a relative distance may be retrieved.

It may be determined whether a morpheme corresponding to "chaj/VV" is located after the POI category, and whether a morpheme "a/EC" is located immediately after chaj/VV (e.g., after retrieving the grammars).

If the grammar recognition is completed, a grammar that matches the input sentence "geuncheo café chaj-a" may be retrieved.
Rule: $distance=qt_rel_distance $dest=poi_category chaj/VV+a/EC According to the above grammar, in the input sentence, "geuncheo" has a type of a relative distance and has a role that is a value of the slot representing a distance in the sentence. "café" has a type of a POI category, that is, the industry, and has a role that is a value of the slot representing a destination in the sentence.

As described above, if one grammar is generated for each training sentence and then stored as it is, an excessively large space of memory may be occupied to store the pre-generated grammars. Also, if all of the numerous candidate grammars are analyzed in recognizing the grammar of the input sentence, the efficiency of the analysis may decrease and a great amount of time may be required for the analysis depending on the performance of the processor.

For example, candidate grammars may be assumed as follows.

r1→s1 t1 t2,
r2→s1 t1 s2,
r3→s1 t1 t3

If there are three candidate grammars and an input sentence has a grammar of s1 t1 x, three times of analysis may be repeated on s1 and t1, which are elements common to the grammars.

Accordingly, a method of generating grammars may compress some grammars having a common element among grammars generated for each training sentence so that the capacity of a memory used for storing grammars may be reduced and the analysis efficiency may be improved.

The method of generating grammars may be included in the method of processing a natural language, or may be performed by the dialog system 100, similar to the method of processing a natural language. If the method of generating grammars is performed by the dialog system 1000, the method of generating grammars may be performed by the grammar generator 121 described above.

Figure 5:
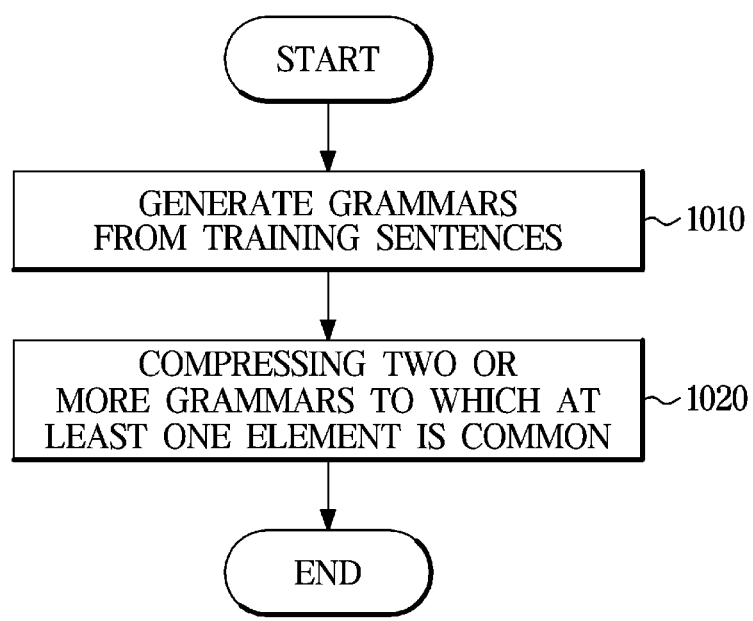
FIG. 5 is a flowchart showing a method of generating grammars.

FIG. 5 is a flowchart showing a method of generating grammars.

Referring to FIG. 5, a method of generating grammars may include generating a plurality of grammars from a plurality of training sentences (1010) and compressing, among the generated plurality of grammars, two or more grammars to which at least one element is common (1020).

As described above, the plurality of training sentences used to generate the grammars may be a tagged corpus that is subjected to POS tagging. The definition of the grammars generated using the training sentences and the description of the symbols used in the definition of the grammars may be the same as those described above in the operation of the grammar generator 121.

In the compressing of the grammars, elements common to the plurality of grammars may be distinguished from elements not common to the plurality of grammars, and two or more grammars having common elements may be compressed into one grammar so that repeated analysis may be prevented or reduced on the common elements.

Hereinafter, various methods of compressing grammars will be described in detail.

Figure 7:
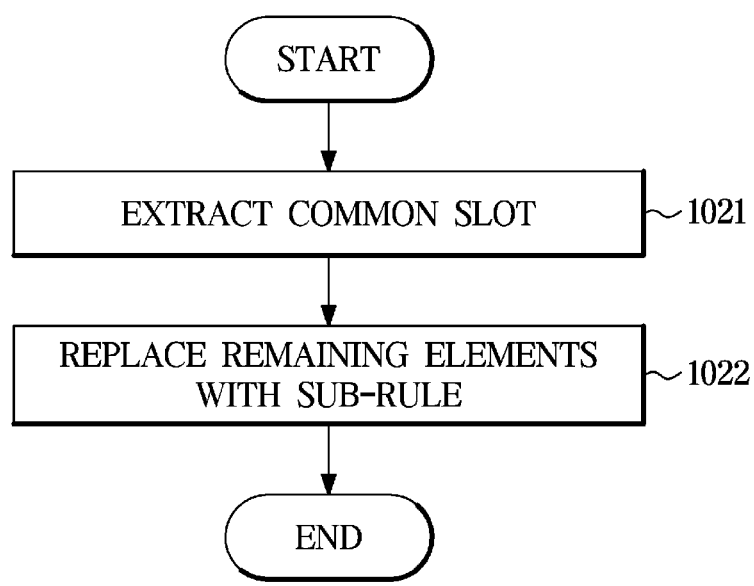
FIGS. 7, 8, and 9 are flowcharts illustrating a process of compressing a plurality of grammars by each type of method shown in the table of FIG. 6.
Figure 8:
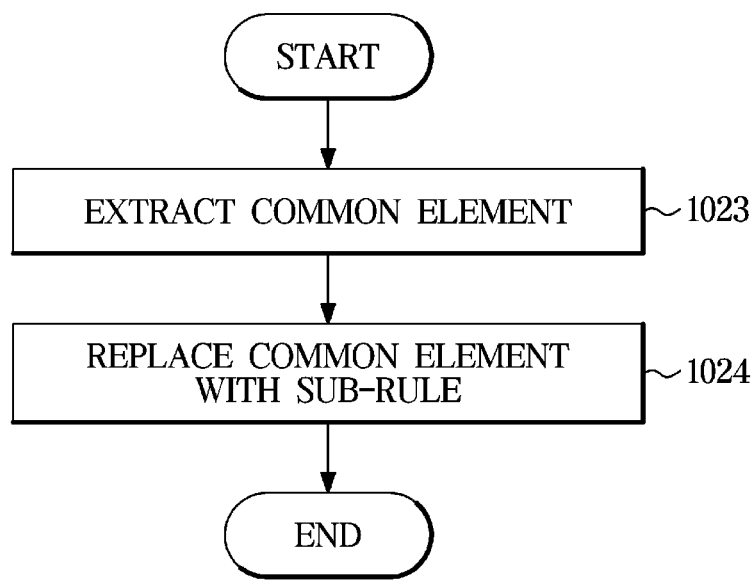
Figure 9:
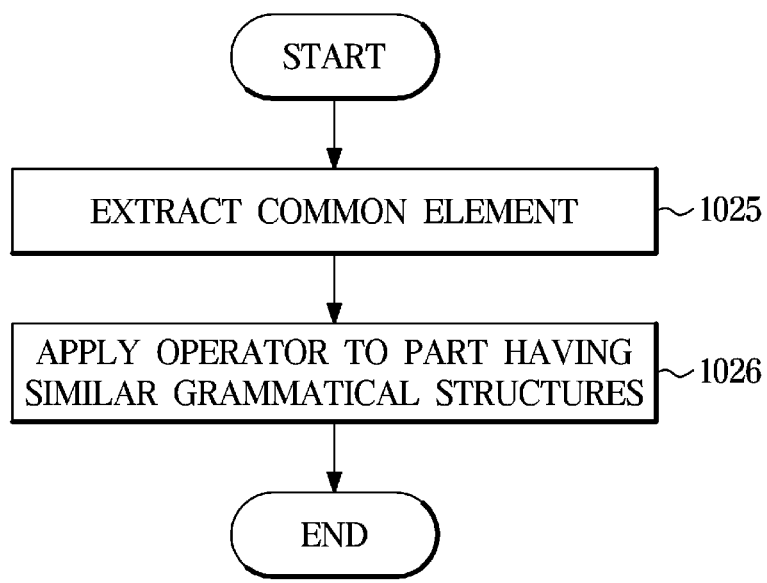

FIG. 6 is a table showing types of methods of compressing a plurality of grammars in a method of generating grammars. FIGS. 7, 8, and 9 are flowcharts illustrating a process of compressing a plurality of grammars by each type of method shown in the table of FIG. 6.

First, symbols used in the method of compressing grammars to be described below are summarized in [Table 2] below.

TABLE 2

| Symbol | Description |
| --- | --- |
| t | token in a unit of morpheme |
| s | slot |
| R | grammar, including a combination of slots and tokens |
| v | sub-rule, including a combination of slots and tokens |
| X → Y | X is replaceable with Y |
| X → Y\|Z | X is replaceable with Y or Z |
| T? | T may or may not be present |

Among the symbols defined in [Table 2], t, s, and v are lowercase letters, and are distinguished from the symbols used in the definition of grammar, G=(V, T, S, P) described above.

For example, the grammar of a training sentence "geuncheo café chaj-a" may be defined as follows.

r1→s1 s2 t1 t2
s1→QT_REL_DISTANCE→geuncheo
s2→POI_CATEGORY→café
t1→chaj/VV
t2→a/EC Here, s1, s2, t1, and t2 correspond to respective elements of the grammar r1. That is, each element of a grammar refers a slot or token, and a slot or token in a grammar may represent a role of the slot or token in the sentence or a grammatical expression of a relationship between morphemes or parts of speech.

Referring to FIG. 6, the method of compressing two or more grammars may include a slot centric method in which non-common elements are replaced with a sub-rule, an n-gram method in which common elements are replaced with a sub-rule, and an edit distance method in which non-common elements are represented using an operator.

Referring to FIGS. 6 and 7, the slot centric method will be described. According to the slot centric method, the method of compressing two or more grammars (1020) of FIG. 5 may include extracting slot(s) common to two or more grammars (1021) and replacing the remaining elements with a sub-rule (1022).

For example, the original grammars generated from training sentences may be expressed as follows.

r1→s1 t1 t2 t3 t2
r2→s1 t1 t3

A slot common to both grammars r1 and r2 is s1, and the remaining elements t1 t3 and t1 t2 t3 t2 are not common to the grammars r1 and r2. Therefore, the grammars r1 and r2 may be compressed into a new grammar r' by replacing the non-common elements with a sub-rule v1 as follows.

r'→s1 v1
v1→(t1 t3)|(t1 t2 t3 t2)

Referring to FIGS. 6 and 8, the n-gram method will be described. According to the N-gram method, the method of compressing two or more grammars (1020) of FIG. 5 may include extracting elements common to two or more grammars from the two or more grammars without distinguishing between tokens and slots (1023), and replacing the common elements with a sub-rule (1024).

For example, the original grammars generated from training sentences may be expressed as follows, r1→t2 t3 s1 t3 t1
r2→t2 t3 s2 t3 t1

Elements common to both grammars r1 and r2 are t3 t1 and t2 t3, and the remaining elements 51 and s2 are not common to the grammars r1 and r2. Therefore, the grammars r1 and r2 may be compressed into a new grammar r' by replacing the common elements with sub-rules v1 and v2 as follows.

r' →v1 (s1|s2) v2
v1→t2 t3
v2→t3 t1

Referring to FIGS. 6 and 9, the edit distance method will be described. According to the edit distance method, the method of compressing two or more grammars (1020) of FIG. 5 may include extracting elements common to two or more grammars from the two or more grammars (1025) and applying an operator to a part having similar grammatical structures (1026). For example, elements that are not common to the two or more grammars may be combined with a grammatical operator depending on the edit distance between the elements.

For example, the original grammars generated by training sentences may be expressed as follows, r1→t1 s1 t2 t3
r2→t1 t4 s1 t2 t5

Elements common to both grammars r1 and r2 are t1, s1, and t2, and the remaining elements t4, t3, and t5 are not common to the grammars r1 and r2. Therefore, the grammars r1 and r2 may be compressed into a new grammar r' by representing the non-common elements using a conditional operator (?) or an OR operator (or) as follows.

r'→t1 t4? s1 t2 (t3|t5)

Grammars may be compressed using one of the methods of compressing grammars described above, or may be compressed using a combination of two or more of the methods of compressing grammars so that the compression performance may be improved. For example, the sub-rule itself may be compressed using a combination of the slot centric method and the edit distance method.

In the above example(s), the names of the respective grammar compression methods are given to be distinguished from each other, but aspects of the disclosure are not limited to the names or the meanings of the names. Therefore, regardless of the name(s) and/or symbol(s), any method of compressing grammars may be included in the scope of the disclosure as long as it can compress grammars according to the above method(s).

Figure 10:
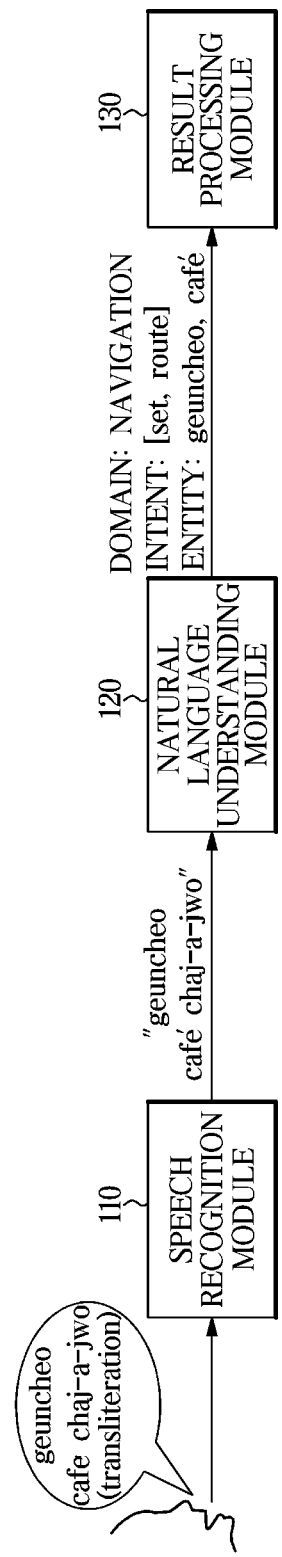
FIG. 10 is a diagram illustrating a process in which a service corresponding to an utterance of a user is provided by a method of processing a natural language.

FIG. 10 is a diagram illustrating a process in which a service corresponding to an utterance of a user is provided by a method of processing a natural language.

In the example of FIG. 10, a user inputs an utterance "geuncheo café chaj-a-jwo (find a nearby cafe)". The input utterance may be converted into text by the speech recognition module 110, and the natural language understanding module 120 may apply natural language analysis, natural language understanding, and the like to the input sentence (e.g., a natural language "geuncheo café chaj-a-jwo") to identify the intention of the user.

The input sentence may be separated in units of morphemes, and the grammar of the input sentence separated in units of morpheme may be recognized. In order to recognize the grammar, a state machine may be used to retrieve a grammar that matches the input sentence among a plurality of pre-stored grammars.

The following description is made in relation that five grammars are generated from a plurality of learning sentences as an example.

$distance=qt_rel_distance+e-seo/JKB $dest=poi_category chaj/VV+a/EC
$distance=qt_rel_distance+e-seo/JKB $dest=poi_category chaj-a-bo/VV+a/EC
$distance=qt_rel_distance+e-seo/JKB $dest=poi_category chaj/VV+a/EC+ju/VV+uh/EC
$distance=qt_rel_distance+e-seo/JKB $dest=poi_category chaj/VV+a/EC+ju/VV+eul-lae/EC
$distance=qt_rel_distance+e-seo/JKB $dest=poi_category chaj/VV+gi/ETN In the five grammars described above, an element "$distance=qt_rel_distance+e-seo/JKB $dest=poi_category" is common to the five grammars. The remaining elements except for the common element may be defined as a set of expressions having a meaning of "chaj-neun-da", that is, as a set "find".

Find: chaj/VV+a/EC, chaj-a-bo/VV+a/EC, chaj/VV+a/EC+ju/VV+uh/EC, chaj/VV+a/EC+ju/VV+eul-lae/EC, chaj/VV+gi/ETN The grammar generator 121 may replace the non-common elements with a sub-rule corresponding to "find" to generate a compressed grammar described below and store the compressed grammar, so that, if the grammar recognizer 122 recognizes a grammar of an input sentence having the common element, repeated analysis on each common element may be prevented. Some grammar elements, such as EC (e.g., connective endings or postpositions), may be unique for some languages (e.g., Korean, Japanese) but may not exist in some other languages (e.g., English). The grammar rule generation training may be performed based on the unique grammar elements of a particular language.

$distance=qt_rel_distance+e-seo/JKB
$dest=poi_category % find

The natural language understanding module 120 may perform semantic analysis, pragmatic analysis, etc. on the grammar recognition result to output a NLU analysis result as follows:

Domain: Navigation
Intent: [Set. route]
Slot: 1. type: QT_REL_DISTANCE, role: DISTANCE, value: geuncheo
2. type: POI_CATEGORY, role: DEST, value: café

Here, "geuncheo" and "café" used to fill the slots correspond to entities required to execute an intent [Set. route].

The result processing module 130 may search for a cafe located within a predetermined distance based on the current location, provide information about the found cafe, and guide a route to the found cafe according to a user's selection. As needed, the result processing module 130 may request information from an external server, or transmit a signal directly to the user terminal.

The method of processing a natural language, the method of generating grammars, and the dialogue system may generate a grammar used to analyze a natural language by compressing a plurality of grammars including a common element so that resources and time required to recognize the grammar of an input sentence may be reduced.

The method of processing a natural language, the method of generating grammars, and the dialogue system may be stored in the form of instructions executable by a computer in a recording medium. The instructions may be stored in the form of program code and, when executed by a processor, perform the operations described herein. The recording medium may be embodied as a non-transitory recording medium.

The computer-readable recording medium may include all types of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the method of processing a natural language, the method of generating grammars, and the dialogue system may generate a grammar used for analyzing a natural language by compressing a plurality of languages including common elements so that resources and time required for recognizing a grammar of an input sentence can reduced.

Although various examples of the present disclosure have been described for illustrative purposes, those skilled in the art will appreciate that various modifications, additions, and/or substitutions are possible, without departing from the scope and spirit of the disclosure. Therefore, the described examples of the present disclosure have not been described for limiting purposes.

What is claimed is:

1. A method performed by a computing device, the method comprising:
   detecting an utterance of a user;
   extracting, using a speech recognition engine, at least one feature vector associated with the detected utterance of the user;
   converting the utterance of the user into an input sentence by converting, based the extracted at least one feature vector and based on trained reference patterns, the utterance of the user into the input sentence, wherein the trained reference patterns are trained based on at least one of a machine learning model or a deep learning model;
   receiving a plurality of training sentences each comprising a plurality of tagged corpus;
   generating, based on the plurality of training sentences, a plurality of computer-coded grammar rules, wherein the plurality of computer-coded grammar rules comprises at least one computer-coded operator;
   dividing, by the computing device, the input sentence into a plurality of morphemes;
   performing, based on a plurality of computer code symbols, a computerized compression process of at least two computer-coded grammar rules;
   determining, from among the plurality of computer-coded grammar rules and based on the plurality of morphemes, a computer-coded grammar rule for the input sentence, wherein the plurality of computer-coded grammar rules represent structural properties of a sentence defined by rules for a syntactic analysis of the input sentence, wherein the determined computer-coded grammar rule is obtained by compressing the at least two computer-coded grammar rules together, and wherein each of the at least two computer-coded grammar rules comprises at least one common computer-coded grammar element between the at least two computer-coded grammar rules; and
   outputting, based on the determined computer-coded grammar rule, a result indicating a meaning of the input sentence.

2. The method of claim 1,
   wherein each of the at least two computer-coded grammar rules comprises a plurality of computer-coded grammar elements coded for natural language processing, and wherein the plurality of computer-coded grammar elements comprises at least one slot and at least one token.

3. The method of claim 2, wherein the determining the computer-coded grammar rule comprises:
   determining, from among the plurality of computer-coded grammar elements, at least one common slot and remaining computer-coded grammar elements; and
   replacing the remaining computer-coded grammar elements with at least one computer-coded sub-rule.

4. The method of claim 1, wherein the determining the computer-coded grammar rule comprises replacing the at least one common computer-coded grammar element with at least one computer-coded sub-rule, and
   wherein in the determined computer-coded grammar rule, at least one remaining computer-coded grammar element is represented by using an operator.

5. The method of claim 1, further comprising
   determining, based on the meaning of the input sentence, a plurality of classifiers corresponding to the input sentence, wherein the plurality of classifiers comprises a domain, an intent, and an entity.

6. The method of claim 1, wherein the determining the computer-coded grammar rule comprises:
   recognizing, based on the plurality of morphemes, at least one slot; and
   determining, based on a type and location of the at least one slot, a matching computer-coded grammar rule as the determined computer-coded grammar rule.

7. A method performed by a computing device, the method comprising:
   detecting an utterance of a user;
   extracting, using a speech recognition engine, at least one feature vector associated with the detected utterance of the user;
   converting the utterance of the user into an input sentence by converting, based the extracted at least one feature vector and based on trained reference patterns, the utterance of the user into the input sentence, wherein the trained reference patterns are trained based on at least one of a machine learning model or a deep learning model;
   receiving a plurality of training sentences each comprising a plurality of tagged corpus;
   generating, by the computing device and based on the plurality of training sentences, a plurality of computer-coded grammar rules, wherein the generated computer-coded grammar rules represent structural properties of a sentence defined by rules for a syntactic analysis of the training sentences, and wherein the plurality of computer-coded grammar rules comprises at least one operator;
   selecting, among the plurality of computer-coded grammar rules, at least two computer-coded grammar rules, wherein each of the at least two computer-coded grammar rules comprises at least one common computer-coded grammar element between the at least two computer-coded grammar rules;
   generating a compressed computer-coded grammar rule by compressing the at least two computer-coded grammar rules together, based on a plurality of computer code symbols, via a computerized compression process of the at least two computer-coded grammar rules; and
   storing the compressed computer-coded grammar rule.

8. The method of claim 7, wherein each of the at least two computer-coded grammar rules comprises a plurality of computer-coded grammar elements, and wherein the plurality of computer-coded grammar elements comprises at least one slot and at least one token.

9. The method of claim 8, wherein the compressing the at least two computer-coded grammar rules comprises:
determining, from among the plurality of computer-coded grammar elements, at least one common slot and remaining computer-coded grammar elements; and
replacing the remaining computer-coded grammar elements with at least one sub-rule.

10. The method of claim 7, wherein the compressing the at least two computer-coded grammar rules comprises:
replacing the at least one common computer-coded grammar element with at least one computer-coded sub-rule.

11. The method of claim 7, wherein in the compressed computer-coded grammar rule, at least one remaining computer-coded grammar element is represented by using an operator.

12. A system comprising:
at least one processor; and
memory storing instructions that, when executed by the at least one processor, cause the system to:
detect an utterance of a user;
extract, using a speech recognition engine, at least one feature vector associated with the detected utterance of the user;
convert the utterance of the user into an input sentence by converting, based the extracted at least one feature vector and based on trained reference patterns, the utterance of the user into the input sentence, wherein the trained reference patterns are trained based on at least one of a machine learning model or a deep learning model;
receive a plurality of training sentences each comprising a plurality of tagged corpus;
generate, based on the plurality of training sentences, a plurality of computer-coded grammar rules, wherein the plurality of computer-coded grammar rules comprises at least one computer-coded operator;
divide the input sentence into a plurality of morphemes;
perform, based on a plurality of computer code symbols, a computerized compression process of at least two computer-coded grammar rules;
determine, from among the plurality of computer-coded grammar rules and based on the plurality of morphemes, a computer-coded grammar rule for the input sentence, wherein the plurality of computer-coded grammar rules represent structural properties of a sentence defined by rules for a syntactic analysis of the input sentence, wherein the determined computer-coded grammar rule is obtained by compressing the at least two computer-coded grammar rules together, and wherein each of the at least two computer-coded grammar rules comprises at least one common computer-coded grammar element between the at least two computer-coded grammar rules; and
output, based on the determined computer-coded grammar rule, a result indicating a meaning of the input sentence.

13. The system of claim 12,
wherein each of the at least two computer-coded grammar rules comprises a plurality of computer-coded grammar elements coded for natural language processing, and wherein the plurality of computer-coded grammar elements comprises at least one slot and at least one token.

14. The system of claim 12, wherein the determined computer-coded grammar rule comprises at least one common slot and remaining computer-coded grammar elements, and
wherein in the determined computer-coded grammar rule, the remaining computer-coded grammar elements are replaced with at least one computer-coded sub-rule.

15. The system of claim 12, wherein in the determined computer-coded grammar rule, the at least one common computer-coded grammar element is replaced with at least one computer-coded sub-rule, and
wherein in the determined computer-coded grammar rule, at least one remaining computer-coded grammar element is represented by using an operator.

16. The system of claim 12, wherein the instructions, when executed by the at least one processor, cause the system to determine, based on the meaning of the input sentence, a plurality of classifiers corresponding to the input sentence, wherein the plurality of classifiers comprises a domain, an intent, and an entity.

17. The system of claim 12, wherein instructions, when executed by the at least one processor, cause the system to:
recognize, based on the plurality of morphemes, at least one slot; and
determine, based on a type and location of the at least one slot, a matching computer-coded grammar rule as the determined computer-coded grammar rule.

* * * * *